Patented May 15, 1951

2,553,386

UNITED STATES PATENT OFFICE 2,553,386

REACTION PRODUCTS OF AMINOTRIAZINES, ALDEHYDES, NITROPARAFFINS, AND HYDROGEN

Milton J. Scott, Springfield, and Elwood F. Jackson, Oxford, Mass., assignors to Monsanto Chemical Company, St. Louis, Mo., a corporation of Delaware No Drawing. Application April 2, 1947, Serial No. 738,926

4 Claims. (Cl. 260—45.2)

This invention relates to anion exchange or acid absorbing resins. More particularly, the invention relates to acid absorbing or anion exchange resins comprising modified aminoplasts and to methods for preparing them.

The use of resinous compositions as anion exchange or acid absorbing media has become increasingly important, especially in the purification of foodstuffs such as sugar syrups. To be economically useful, such resins must meet many critical requirements.

In the first place, the resins must be colorless or must contain no color which can be leached out by the solutions under treatment. For instance, any color leaching out into cane sugar solutions would be particularly undesirable.

Furthermore, the resins must not only be insoluble in water, acids and alkalies but they must not swell or soften excessively in contact with such materials. Water-solubility would lead to continual losses of resin and contamination of the material being treated. Swelling and softening of the resins would lead to coalescense of the resin particles and subsequent blocking of the filter beds.

The resins must not be toxic and cannot have toxic materials associated with them which might be leached out by the materials being purified especially if those materials are foodstuffs.

The resins must have a high capicity for absorption of acids and the operating pH should be high enough to remove all acidic materials since a relatively low operating pH confines the use of the resin to the removal of strong acids.

After the acid absorbing capacity of the resins has been exhausted, it must be possible to easily, efficiently and economically regenerate the resin for reuse.

The known acid absorbing resins fail to meet one or more of these exacting requirements.

An object of this invention is to provide new acid absorbing or ion exchange resins.

A further object is to provide resins having high acid absorptive properties which may be easily and simply regenerated.

Another object is to provide acid absorbing resins which will meet all of the requirements cited above.

These and other objects are attained by reacting an aldehyde reactive amino compound with an aldehyde, further reacting the composition with a nitroparaffin and reducing the product.

The following examples are given in illustration and are not intended to limit the scope of this invention. Where parts are mentioned, they are parts by weight.

Example I 126 parts of melamine (1 mol) and 405 parts formalin (5 mols of formaldehyde) were mixed with 550 parts water. The pH of the mixture was adjusted to about 8–9 and the temperature was gradually raised to about 75° C. in thirty minutes. The pH was maintained from 8–9 and the temperature was maintained at 75-85° C. for about 7 hours. The mixture was then cooled to 40° C. and 366 parts of nitromethane (6 mols) were added to the reaction mixture. Following the addition of the nitromethane, 60 parts of concentrated hydrochloric acid were added to the reaction mixture which was then agitated overnight (15 hours) at room temperature. A clear, soft gel was obtained from which excess water and nitromethane were removed by filtration.

After filtration, 780 parts of concentrated hydrochloric acid were slurried with the gel and 540 parts of tin (mossy) were then added slowly to the slurry while maintaining the temperature of the reaction at about 40–50° C. The reaction mixture was then agitated at room temperature until the tin was dissolved. The resin was filtered, slurried with 550 parts water and 40 parts of concentrated hydrochloric acid, filtered again, washed with water and again washed with acid. The resin hydrochloride thus formed was treated with excess alkali to regenerate the resin. The regenerated resin was then washed alkali free and air dried to 35–40% water content. The resin was granular, white and porous and remained white even when heated for several days at 105° C.

A static evaluation of the above resin screened to 10–30 mesh was made. The resin absorbed 216 mgs. hydrochloric acid per gram of dry resin.

Example II 504 parts of melamine (4 mols) were mixed with 1620 parts formalin (20 mols of formaldehyde) and 2200 parts water. The pH of the mixture was adjusted to about 8 to 9 and the temperature was gradually brought to about 70° C. in thirty minutes. The pH was maintained from 8 to 9 and the temperature was kept from 75–85° C. for about 7 hours. At this point the mixture was cooled to 40° C. and the 1464 parts (24 mols) of nitromethane were added to the reaction mixture. Following the addition of the nitromethane, 240 parts of concentrated hydrochloric acid were added to the reaction mixture which was then agitated overnight (15 hours) at room temperature. A clear, soft gel was obtained which was filtered to remove excess water and nitromethane.

One-fourth of the total resin was slurried with 1190 parts of concentrated hydrochloric acid. 203 parts of strip aluminum were added slowly to the flask while maintaining the temperature at 40-60° C. The reaction mixture was then allowed to agitate at room temperature until the aluminum was essentially all dissolved. The resin was filtered and washed with acid to remove aluminum and aluminum salts. The resin hydrochloride thus formed was regenerated with exces alkali, washed with water and air dried to yield a white, granular, porous resin which showed high acid absorbing and anion exchange properties.

Example III 126 parts of melamine (1 mol) were mixed with 324 parts of formalin (4 mols of formaldehyde). The pH of the mixture was adjusted to about 8 to 9 with 5% aqueous sodium hydroxide. The mixture was then heated at reflux temperature at atmospheric pressure until a drop of the reaction mixture turned milky when placed in ice water. 244 parts (4 mols) of nitromethane were added to the reaction mixture. The new mixture was heated at reflux temperature at atmospheric pressure for about 20 minutes when a gel was obtained.

The gel was dried at about 105° C. until it was hard and brittle and it was then comminuted to a fine powder. 100 parts of the powder were slurried with 400 parts of water and 200 parts of powdered zinc; 600 parts of concentrated hydrochloric acid were then added gradually to the slurry with constant agitation. After the initial heat of reaction was dissipated, the mixture was gently heated until all of the zinc was consumed. The product was a water-insoluble finely divided resin.

The resin was recovered by filtration, washed with water, slurried with water and made basic with 20% aqueous sodium hydroxide, and finally washed with more water and dried at about 105° C. The product will remove relatively large amounts of hydrochloric acid or other acidic materials from water by merely filtering the aqueous acid through the powdered resin. The resin may then be regenerated by passing aqueous sodium hydroxide through the resin.

Example IV 126 parts of melamine (1 mol) were mixed with 243 parts of formalin (3 mols of formaldehyde). The pH of the mixture was adjusted to about 8 to 9 with 5% aqueous sodium hydroxide. The mixture was then heated at reflux temperature at atmospheric pressure until a drop of the reaction mixture turned milky when placed in ice water. 267 parts (3 mols) of 2-nitropropane were added to the reaction mixture. The new mixture was heated at refluxing temperature at atmospheric pressure for about 20 minutes when a gel was obtained.

The gel was then dried at about 105° C. until it was hard and brittle and it was then comminuted to a fine powder. 100 parts of the powder were slurried with 400 parts of water and 200 parts of powdered zinc. 600 parts of concentrated hydrochloric acid were added gradually to the slurry with constant agitation. After the initial heat of reaction was dissipated, the mixture was gently heated until all of the zinc was consumed. The product was a water-insoluble, finely divided resin.

The resin was recovered by filtration, washed with water, slurried in water and made basic with 20% aqueous sodium hydroxide and finally washed with more water and dried at about 105° C. The product will remove relatively large amounts of hydrochloric acid or other acidic materials from water by merely filtering the aqueous acid through the powdered resin. The resin may then be regenerated by passing aqueous sodium hydroxide through the resin.

Example V 126 parts of melamine (1 mol) were mixed with 405 parts of formalin (5 mols of formaldehyde). The pH of the mixture was adjusted to about 8 to 9 with 5% aqueous sodium hydroxide. The mixture was then refluxed at atmospheric pressure until a drop of the reaction mixture turned milky when placed in ice water. 366 parts of nitromethane (6 mols) were added to the reaction mixture. The new mixture was heated at reflux temperature at atmospheric pressure for about 20 minutes when a gel was obtained.

The gel was then dried at about 105° C. until it was hard and brittle and it was then comminuted to a fine powder. 100 parts of the powder were slurried with 400 parts of water and 200 parts of powdered zinc. 600 parts of concentrated hydrochloric acid were added gradually to the slurry with constant agitation. After the initial heat of reaction was dissipated, the mixture was gently heated until all of the zinc was consumed. The product was a water-insoluble resin.

The resin was recovered by filtration, washed with water until essentially neutral, and dried at 105° C. The resin obtained was acid absorbing and could be easily regenerated.

Example VI 126 parts of melamine (1 mol) were mixed with 486 parts of formalin (6 mols of formaldehyde). The pH of the mixture was adjusted to about 8-9 with 5% aqueous sodium hydroxide. The mixture was then refluxed at atmospheric pressure until a drop of the reaction mixture turned milky when placed in ice water. 1150 parts of water were added, followed by 366 parts of nitromethane (6 mols). This mixture was heated at 50-60° C. with constant agitation until insolubles began to appear. At this point, 60 parts of concentrated hydrochloric acid were added. The hydrochloric acid serves to solubilize the resin for a greater period of time. The mixture was agitated for about 36 hours at room temperature until a soft, white, insoluble gel was obtained.

100 parts of the gel, based on solids, were slurried with 300 parts water and 200 parts zinc. 600 parts of concentrated hydrochloric acid were added gradually to the slurry with constant agitation. After the initial heat of reaction was dissipated, the mixture was gently heated until all of the zinc was consumed. The product was a water-insoluble resin.

The resin was recovered by filtration, washed with water, slurried with water and made basic with 20% aqueous sodium hydroxide, then washed with water until essentially neutral, and dried at 105° C. An acid absorbing resin was obtained. The resin could be regenerated with alkali.

*Example VII*

126 parts of melamine (1 mol) were mixed with 243 parts of formalin (3 mols of formaldehyde). The pH of the mixture was adjusted to about 8 to 9 with 5% aqueous sodium hydroxide. The mixture was then refluxed at atmospheric pressure until a drop of the raction mixture turned milky when placed in ice water. 1150 parts of water were added, followed by 183 parts of nitromethan (3 mols). This mixture was heated at 50–60° C. with constant agitation until insolubles began to appear. At this point, 60 parts of concentrated hydrochloric acid were added and the reaction continued at 50–60° C. until a soft, white, insoluble gel was obtained (about 36 hours).

100 parts of gel, based on solids, were slurried with 300 parts water and 200 parts zinc. 600 parts of concentrated hydrochloric acid were added gradually to the slurry with constant agitation. After the initial heat of reaction was dissipated, the mixture was gently heated until all of the zinc was consumed. The product was a water-insoluble resin.

The resin was recovered by filtration, washed with water, slurried with water and made basic with 20% aqueous sodium hydroxide, then washed with water until essentially neutral, and dried at 105° C. An acid absorbing resin was obtained which could be regenerated with alkali.

In place of the melamine shown in the examples, other aldehyde reactable amino compounds having at least 1 amino group to which at least 1 active hydrogen atom is attached, may be employed, such as urea, thiourea, dicyandiamide, guanidine, substituted guanidines, thioammeline, aminotriazines including formoguanamine, melam, melem, melon, 2-amino-1,3,5-triazine, triazines wherein one or more of the amino groups are substituted by hydroxy, halogen, alkyl, aryl, or aralkyl groups, triazines wherein the hydrogen atoms of the amino groups are partially substituted by amino, alkyl, aryl or aralkyl groups such as 2,4,6-trihydrazino-1,3,5-triazine, 2,4,6-triethyl-triamino-1,3,5-triazine, 2,4,6-triphenyl-triamino-1,3,5-triazine, etc. Mixtures of the aldehyde reactable amino compounds may be used.

The aldehyde used may be formaldehyde or other aliphatic, aromatic or heterocyclic aldehydes such as acetaldehyde, propionaldehyde, butyraldehyde, valeraldehyde, octaldehyde, benzaldehyde, furfural, cinnamaldehyde, crotonaldehyde, etc. Mixtures of two or more aldehydes may be used. The amount of aldehyde used will depend on the number of active hydrogen atoms associated with the particular amino compound being treated. Preferably, sufficient aldehyde should be used to react with all of the active hydrogens present and it is often found convenient to use an excess of aldehyde. For example, with melamine, 6 or more mols of aldehyde may be used. However, it is within the scope of this invention to use lesser amounts of aldehyde down to about one mol per mol of amino compound.

The reaction between the aldehyde reactable amino compound and the aldehyde may be carried out at reflux temperatures at atmospheric pressure at a pH of about 7–9 until a drop of the product turns milky in ice water (the hydrophobe point), or until the aldehyde is all essentially reacted with the amino compound. It is sometimes desirable to react the aldehyde and amino compound at lower than reflux temperatures to get more complete reaction without condensation. In this case, the reaction is considered complete when essentially all the aldehyde is used up and a hydrophobe is not necessarily reached.

The nitro compounds which may be used in the second step of the process of this invention are nitroparaffins, or substituted nitroparaffins, having at least one hydrogen atom attached to the same carbon atom to which the nitro group is attached. Examples of the nitroparaffins which may be used are nitromethane, nitroethane, 1-nitropropane, 2-nitropropane, dinitroneopentane, 1-chloro-2-nitropropane, 1-chloro-1-nitropropane, 1-fluoro-2-nitropropane, 1-phenyl-2-nitropropane, 1-α-nitro-α-propyl-3-β-nitropropyl-5-γ-nitropropyl benzene. A mixture of the nitroparaffins may be used. Furthermore, materials like dinitroneopentane may be formed in situ by adding nitromethane and acetone or other ketones to the aldehyde-amino compound reaction product.

The amount of nitroparaffin used will depend on the number of alkylol groups introduced by the reaction between the aldehyde and the amino compound. Since it is preferred to use as many mols of aldehyde as there are active hydrogen atoms on the amino compound, the amount of nitroparaffin used will also be equivalent, on a molar basis, to the number of active hydrogen atoms. This quantity may be substantially less if desired but usually will be at least equivalent, on a molar basis, to the aldehyde employed.

The reaction of the nitroparaffins with the amino (or amido)-aldehyde reaction product may take place under acid, neutral or alkaline conditions. It is preferred to carry this reaction out under acid conditions at a pH of about 2–4 since the acid tends to retard gelation or insolubilization until complete condensation between the nitroparaffin and alkylol-amine has been obtained. The reaction may be carrier out over a period of from about 12 to about 48 hours at a temperature which may range from about 20° C. to the reflux temperature. It is preferred to carry out the reaction at a temperature of from 20 to 50° C. and to continue the reaction until it is essentially complete. During this extended reaction period inert materials such as asbestos fibers may be added to serve as carriers for the resin.

The gel structure of the alkylol-amino-nitroparaffin condensation product may be controlled by the amount of water present during the reaction, i. e., higher water content yields a softer gel structure which may be more easily handled in the reduction step. Furthermore, the particle size of the final resin may be controlled by the dilution of the gel during the reduction step. The filtered gel is slurried with water prior to reduction and it has been found that the particle size of the resin produced decreases as the amount of water increases.

The next step in the process consists in reducing the nitro groups existing in the gel compositions. Prior to reducing, the gel may be dried out in an oven and comminuted, in which case, the water dilution referred to above is not advantageous. However, in the preferred embodiment, the soft gel is slurried in water to form an easily stirring mixture which is then treated with an acid and an acid reactive metal to produce nascent hydrogen which accomplishes the reduction reaction.

The reduction is an exothermal reaction and must be controlled not only to avoid frothing but also to avoid decomposition of the product. This heat of reaction may be controlled both with external cooling and also by the rate of addition of either the acid or the metal. All the metal may be added, followed by the slow addition of acid. However, it is preferred to add most of the acid at the start followed by the slow addition of the metal since this seems to give a more controllable reaction and avoids coating the metal with resin which prevents the acid from reacting with the metal. Antifoaming agents such as octyl alcohol, silicone resins, etc., may be used during the reduction period, if desired.

A good reducing agent is zinc and hydrochloric acid. Other metals may be used, for example, aluminum, tin, cadmium, nickel, iron, etc. Other acids may be used, for example, acetic, chloracetic, formic, phosphoric, sulfamic, etc. In fact, hydrogen itself in the presence of reducing catalysts or mixtures of the same may be used. The amount of reducing agent will depend on the number of nitro groups introdced with the nitroparaffins. An excess above the exact amount required may be used and the excess removed at the end of the reduction reaction.

The exceptionally high acid absorptive properties of the resins of this invention was demonstrated in a continuous column as follows: a transparent tube 5 feet high by 1 inch in inside diameter was mounted in a vertical position. It was equipped with inlet ports at the top for acid solutions, regenerating solutions and wash water. It was equipped with other ports at the bottom for effluent and back wash water. A permeable plate was installed in the bottom of the column to retain the resin.

A resin prepared as in Example I was screened to a 10 to 30 mesh size and was then packed into the column. The resin was backwashed, i. e., water was flowed in from the bottom and out at the top until a 50-75% resin bed expansion was obtained accompanied by a hydraulic classification of the resin particles. The column was then drained at a rate of about .27 ml. per minute per ml. of resin bed volume producing a loosely packed resin bed having essentially no large voids or air spaces.

A standardized solution of 0.1035 N hydrochloric acid was then flowed down through the column at a rate of 0.2 ml. per minute per ml. of resin bed volume until the resin was exhausted. 190 milligrams of acid were absorbed per gram of dry resin.

The resin bed was then backwashed with water to free the bed and swell the resin. After the water was drained off, a 0.54 N solution of sodium hydroxide was passed down through the resin at a rate of approximately 0.8 ml. per minute per ml. of resin bed volume. About 105% of the theoretical amount of sodium hydroxide to neutralize the acid absorbed by the resin was used. The resin was then down washed with water until the effluent was colorless to phenolphthalein.

In the examples, the acid absorbing properties of the resins have been demonstrated with hydrochloric acid. The resins will remove other acids whether they are strong or weak, organic or inorganic. They will even absorb carbonic acid.

In addition to their relatively high power of removing acids from solutions thereof, the new resins are anion exchange media capable of splitting anions from hydrolysable salts. They are even able to remove chlorine from sodium chloride. For example, when a .1 N solution of sodium chloride was passed through a column packed with a resin made as shown in Example I, the effluent had a pH of about 10 and gave substantially no precipitate with silver nitrate showing a nearly complete removal of chlorine ions from the salt solutions.

The resins of this invention have a relatively high power of removing anions or acid molecules from aqueous media. They retain a high rate of anion or acid removal until exhausted, i. e., their efficiency does not gradually taper off but continues at a high level until substantially exhausted. They may then be easily and quickly regenerated by passing aqueous alkali, ammonia, or soda ash through the mass. Furthermore, the resins are white and contain no leachable color, they are completely insoluble and substantially non-swelling in water, and they are non-toxic.

It is obvious that many variations may be made in the processes and products of this invention without departing from the spirit and scope thereof as defined in the appended claims.

What is claimed is:

1. A process which comprises reacting melamine with an aldehyde at elevated temperatures and at a pH of from 8 to 9 until the aldehyde is substantially all reacted, reacting the product with a nitroparaffin having at least one hydrogen atom and one nitro group attached to the same carbon atom at a pH of from 2 to 4 until an insoluble gel is formed, and thereafter reducing the reaction product with hydrogen.

2. A process as in claim 1 wherein the aldehyde is formaldehyde.

3. A process as in claim 2 wherein the nitroparaffin is nitromethane.

4. A process as in claim 2 wherein the nitroparaffin is 2-nitropropane.

MILTON J. SCOTT.
ELWOOD F. JACKSON.

REFERENCES CITED

The following references are of record in the file of this patent:

UNITED STATES PATENTS

| Number | Name | Date |
| --- | --- | --- |
| 2,246,527 | Melof | June 24, 1941 |
| 2,251,234 | Swain | July 29, 1941 |
| 2,285,750 | Swain | June 9, 1942 |
| 2,314,308 | Ellis | Mar. 16, 1943 |
| 2,339,621 | D'Alelio | Jan. 18, 1944 |
| 2,355,402 | Sussman | Aug. 8, 1944 |
| 2,388,235 | Bowman | Nov. 6, 1945 |
| 2,442,989 | Sussman | June 8, 1948 |

FOREIGN PATENTS

| Number | Country | Date |
| --- | --- | --- |
| 120,077 | Australia | June 28, 1945 |